(12) United States Patent
Owen

(10) Patent No.: US 6,811,033 B1
(45) Date of Patent: Nov. 2, 2004

(54) FASTENING DEVICE FOR SCREENING PANELS

(76) Inventor: David Llewellen Owen, 37 Main Road, Eastleigh, 1610 Edenvale (ZA)

(*) Notice: Subject to any disclaimer, the term of this patent is extended or adjusted under 35 U.S.C. 154(b) by 0 days.

(21) Appl. No.: 09/980,235

(22) PCT Filed: Feb. 21, 2000

(86) PCT No.: PCT/ZA00/00027
§ 371 (c)(1),
(2), (4) Date: Mar. 29, 2002

(87) PCT Pub. No.: WO00/73669
PCT Pub. Date: Dec. 7, 2000

(30) Foreign Application Priority Data

May 31, 1999 (ZA) .......................................... 99/03660
Jul. 22, 1999 (ZA) .......................................... 99/04719

(51) Int. Cl.[7] ............................................. B07B 1/49
(52) U.S. Cl. ....................... 209/399; 209/403; 209/405; 209/409
(58) Field of Search ............................... 209/397, 399, 209/403, 405, 408, 409, 412

(56) References Cited

U.S. PATENT DOCUMENTS

| | | | | |
|---|---|---|---|---|
| 4,909,929 A | * | 3/1990 | Tabor | 209/400 |
| 5,361,911 A | * | 11/1994 | Waites, Sr. et al. | 209/399 |
| 5,699,918 A | * | 12/1997 | Dunn | 209/397 |
| 5,755,334 A | * | 5/1998 | Wojcik et al. | 209/405 X |
| 5,769,241 A | | 6/1998 | Woodgate | |
| 5,938,042 A | * | 8/1999 | Freissle et al. | 209/405 |
| 6,267,246 B1 | * | 7/2001 | Russell et al. | 209/399 |

FOREIGN PATENT DOCUMENTS

| | | |
|---|---|---|
| DE | 27 54 044 B | 4/1979 |
| DE | 42 25 173 A | 2/1993 |
| EP | 0 243 500 A | 11/1987 |
| EP | 0 567 361 A | 10/1993 |
| GB | 2 092 917 A | 8/1982 |

* cited by examiner

Primary Examiner—Donald P. Walsh
Assistant Examiner—Joseph Rodriguez
(74) Attorney, Agent, or Firm—Inskeep Intellectual Property Group, Inc.

(57) ABSTRACT

A fastening device (1) for fastening polyurethane screening panels (6,7) to a screen (8) is made up of a composite fastener and a disc stringer support. The composite fastener is a steel bolt (2) and nut (3) with a polyurethan holding component (4) and a polyurethane cover (9) for the bolt head. The disc and stringer support is a stringer (31) serving as a joist spanning between girders of the screen frame, the stringer (31) having no flange and being narrow and deep, with discs (35) set in the top surface of the stringer at spaced apart positions, having a hole (36) in each disc for the bolt and nut and a recess (38) in the stringer underneath each disc for the nut. The bolt and nut have a toggle (14) which allows insertion into the hole in the disc and tightening the bolt and nut entirely from above the screen.

11 Claims, 6 Drawing Sheets

FASTENING DEVICE FOR SCREENING PANELS

FIELD OF THE INVENTION

This invention lies in the field of screening particulate material, non-limiting examples are screens which are used extensively in grading of ores and other materials in mining and process operations. In addition to woven wire screens and perforated sheet and plate screens, screens made up of a plurality of screening panels have attained wide application. Such screening panels, for example, are manufactured by casting a suitable grade of polyurethane and the panels are mounted contiguously in a tiling fashion on a screening frame.

THE PRIOR ART

The fastening of such screening panels onto a frame has received attention in engineering design and been an important factor in the successful application of moulded polyurethane screen panels. Many designs have been developed, merely as examples may be mentioned fastenings shown in South African patent 73/5815 granted to Screenex Wire Weaving Manufacturers (Pty) Ltd and South African patent 80/4039 granted to Steinhaus GmbH. Many variations of such designs have been developed over the intervening years, a feature of the fastenings used up to now being that they are made of the same polymeric material as the screen panels which they hold.

Vibratory frequencies and amplitudes specified in current practice have been selected so that acceleration of the panels at the fastenings does not exceed a generally accepted limit. This limit is about 4.5 G (four point five times the acceleration due to gravity). Beyond this limit experience has shown that the fastenings become unreliable and/or tend to fail prematurely while in service.

Modem practice requires accelerations in excess of the limit mentioned.

Another system used, the so-called clipper system, does have better holding capacity at high accelerations, but is not always appropriate, depending on various considerations applicable to a particular installation, customer's requirements, and the like. Other systems available are subject to wear resulting from a tendency of material being screened seeping into crevices between the fixing parts and the frame causing the frame fixing locations to wear out. The wear reaches a stage where the fastening pin system fails. For example, the hole in the frame in which the fastening is secured becomes oversize due to wear, until the fastening fails. The material being screened in many cases becomes an unfortunately very effective grinding medium acting on the frame.

Thus the screening frame is also an important component in the fastening and acceleration problems which must be addressed in current practice. In current practice the screening frame may either be a frame made up for fixing to a screening machine or it may be a frame existing as part of the screening machine. Such screens generally are a structural fabrication of elongate structural members, usually extending in longitudinal and transverse directions. They form a grid upon the members of which screen panels can be mounted and secured. Structural members commonly used include girders, joists and other beams which may be of I section, angle section, channel section or square tube section, for example. The girders are in general of larger section and are spanned by joists of smaller section. All the sections used provide a web which has a depth sufficient to carry the vertical reciprocating loads and a flange which presents a horizontal surface to support the panels which are carried by the screen frame and to fix them to the frame.

THE INVENTION

In accordance with the present invention, there is provided a fastener for a screening panel, which fastener comprises a combination structure including a metal tensile component and a polymeric holding component which includes a ledge for fastening a panel.

The ledge may be in the form of a shoulder, bush, ridge, land or like structure, which is adapted to fasten a panel down, generally against a screen frame. The screen frame may be a part of a screening machine, or may be made up for a particular application, to be fastened to a screening machine. The ledge must be of sufficient bearing area on the panel, to effectively fasten the panel, during use. If the area is too small, the shearing stresses in the panel material rise to levels at which localised heating develops and the molecular structure of the polymer tends to degrade, leading to failure after a period. With sufficient area, in accordance with this invention, the holding component adequately holds the panel down for more than the service life of the panel.

Although the fastener according to this invention could be used with a conventional frame, the present invention also provides a stringer for preferred use as a joist in a screen frame, the stringer comprising a strip of cross section having a narrow width and depth sufficient to carry vertical reciprocating loads, presenting neither a top nor a bottom web, but a plurality of spaced apart platforms, each platform presenting a fastening formation for a panel and support area around or adjacent the fastening formation, for a panel.

For example, each platform can comprise a disc having a hole in its centre, the hole providing a fastening formation and the surround of the disc a support area for the panel around the hole.

It is desirable that the platform is positioned above or coinciding with the centroid of the stringer section, so as to avoid exerting any eccentric loads on the stringer. If a fastening formation in the form of a hole is then located immediately above the centroid of the stringer, then immediately underneath the hole a recess can be provided in the stringer to accommodate a fastener which co-acts with the hole to fasten the panel, for example, a bolt head of a bolt.

Preferably the upper support surfaces of the platforms is flush with the upper surface of the stringer, so that these surfaces all provide support for panels mounted on the stringer.

Preferably the fastener and the stringer of this invention are used together in order to obtain the maximum advantages of the invention.

In accordance with a preferred embodiment of the invention, screening panels are provided with co-acting formations for co-acting with the fasteners, including in particular, the ledges of the fasteners. Preferably that part of the formation for co-acting with the ledge of each fastener is located at an intermediate position in the depth of the panel.

The provision of fasteners in accordance with this invention together with panels having co-acting formations thus also falls within the scope of this invention.

In a preferred application of the invention, those screening panels which are mounted contiguous with adjacent panels are provided with these formations at their edges; this allows the fasteners to each simultaneously fasten two contiguous panels of this kind.

The metal tensile component conveniently in most applications comprises a bolt and nut. A lock washer or locking nut is advisable. The polymeric holding component is preferably a stepped bush through the hole of which the bolt is passed, the step of the bush providing the required ledge for fastening the panel.

In a preferred embodiment, the fastener structure further includes a cover for an exposed portion of the metal tensile component. Where an upper end of the tensile component would otherwise be exposed, it is preferably covered by the cover. The reason is to avoid, as far as possible, exposure of this end to abrasive material being screened and the ingress of material into interstices between the metal tensile component and the polymeric holding component and between the fastener combination structure and the panel and/or the screening frame to which the panel is fastened. For example, the nut and threaded end of the bolt may be uppermost, this is best covered with the cover.

Preferably, the cover is provided with a skirt adapted to be fitted onto the tensile member with the skirt providing an improved barrier to ingress of material being screened into the interstices mentioned above.

Where a panel which has co-acting formations for the fastener is provided, preferably the formations include also a portion for co-acting with the skirt. Preferably these formations allow the skirt to enter partially into the depth of the panel.

In accordance with a preferred embodiment of the invention, the fastener is provided in combination with a toggle or butterfly near an end of the metal tensile component, for engaging a blind hole in a screening frame. A blind hole may arise where the frame uses, for example, square tube members, or other structural members where the tensile member must be connected without access to both sides of the member. The toggle may comprise a strip or plate with the tensile member passing through an offset hole, the plate narrow enough to be passed through a hole in the screening frame member when misaligned, but long enough to be held when aligned. The hole in the screening panel must be of larger diameter than would be necessary for the shaft of the tensile member, e.g. a bolt, to pass through in normal manner. This enlarged hole is large enough to allow the tensile member and toggle to pass through, suitable angled to minimise their effective size. Preferably the polymeric holding component is provided with a further step which fits into the enlarged hole provided in the screen frame, thus locating the tensile member and toggle in a holding position with enhanced security.

THE DRAWINGS

The invention will be more fully described by way of a non-limiting examples which are illustrated in the drawings in which.

THE PREFERRED EMBODIMENTS

Figure 1:
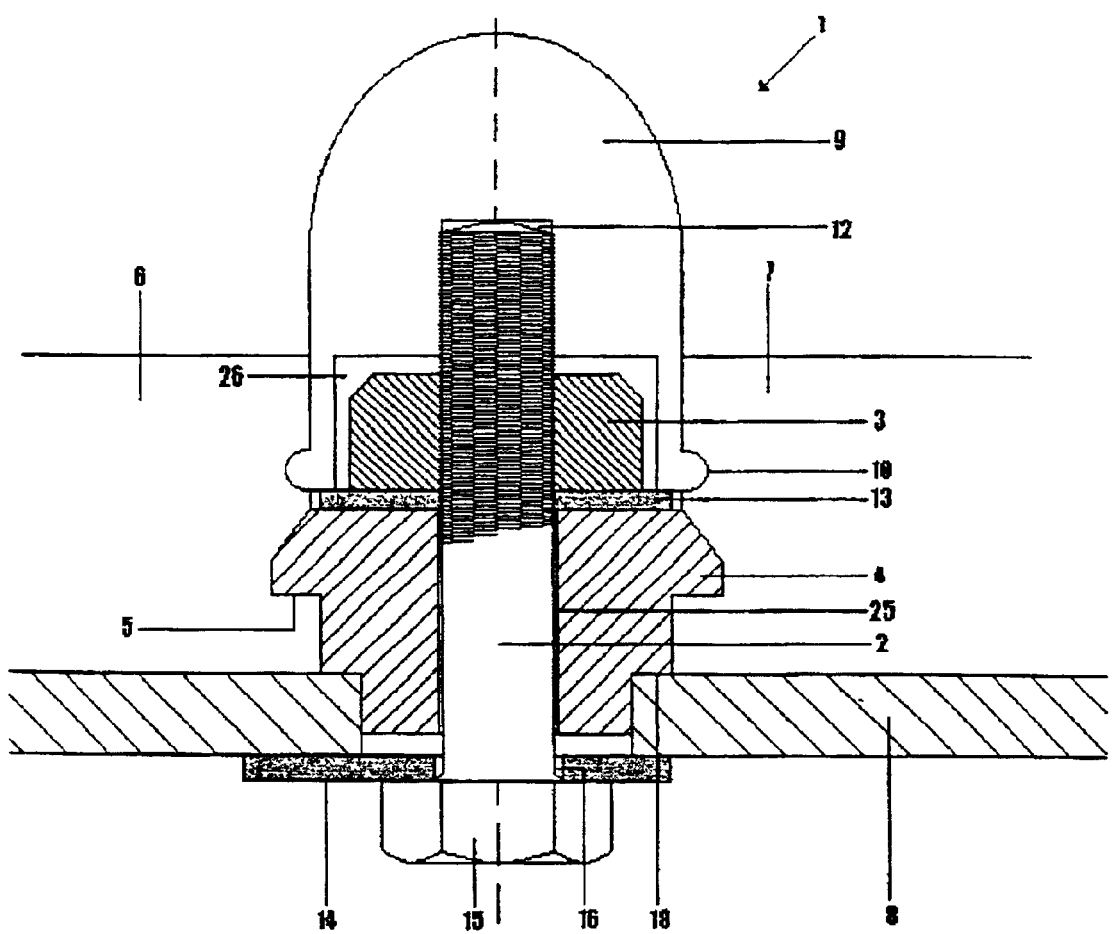
FIG. 1 is a cross sectional elevation of a fastener in accordance with a preferred embodiment of the invention holding adjacent panels on a conventional frame.

As shown in FIG. 1, the fastener 1 comprises a combination structure of a metal (steel) tensile component, in the form of a bolt 2 and nut 3, and a polymeric (polyurethane) holding component 4. The holding component 4 has a ledge 5 or shoulder for holding contiguous panels 6 and 7 and a hole 26 for the bolt. The ledge is formed by a step down in diameter of the bush-like shape of the holding component. The fastener fastens the panels 6 and 7 to a screen frame B. The upper end of the bolt and the nut are covered by a cover 9, also of polyurethane. The cover has a skirt 10 which fits into a co-acting recess formation 11 (see FIG. 7) in the edges of the panels. The bore 12 of the cover is a tight or force fit onto the thread of the bolt, the cover can be knocked on with a hammer. An enlarged part 26 of the bore accomodates the nut 3. A lock washer 13 is used under the nut. A toggle 14 is provided under the bolt head 15 with the bolt passing through an off centre hole 16 in the toggle. The bolt head and toggle are passed through a hole 16 in the screen frame; this is accomplished from above the frame, it not being necessary to reach under the frame.

Figure 2:
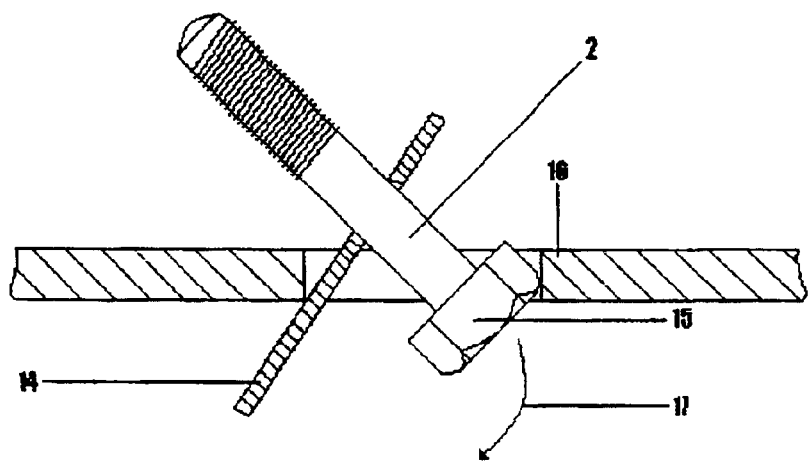
FIG. 2 is a view of a tensile member and toggle.

Referring to FIG. 2, it will be seen that this is made possible by the toggle being narrow enough to be passed through the hole 16 when the toggle is misaligned in the position indicated in FIG. 2; from this position, the toggle and bolt head are passed entirely through the hole, as indicated by the arrow 17, rotated to an aligned position in which the length of the toggle is sufficient to hold as shown in FIG. 1. For this purpose, the hole 16 is larger than would normally be required for the bolt and once in the position, the second step 18 of the holding component fits neatly into the enlarged hole, so as to make the holding by the toggle more secure.

Figure 3:
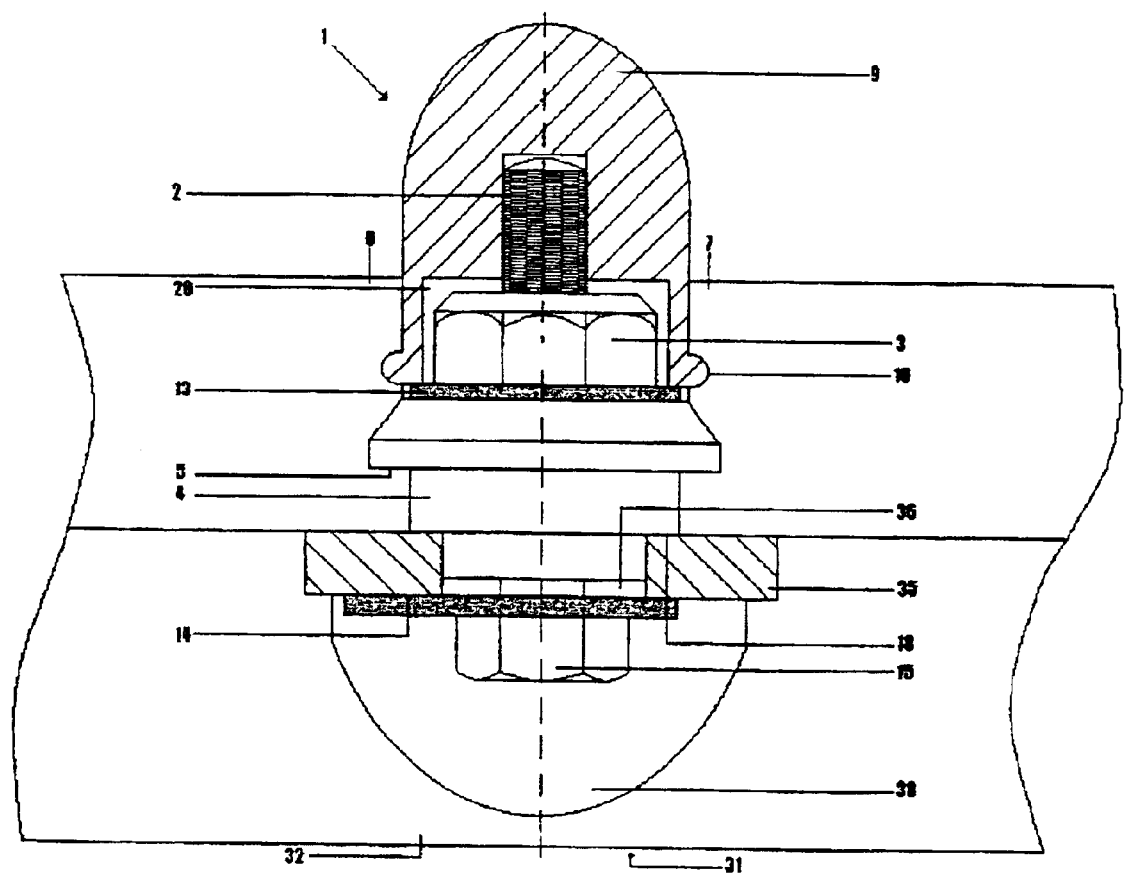
FIG. 3 is an elevation of the fastener shown in FIG. 1, holding adjacent panels on a disc top stringer according to a preferred embodiment of the invention.

FIG. 3 shows the best of all combination according to the preferred embodiment of the invention. Two adjacent panels 6 and 7 are held by a composite fastener 1 as described with reference to FIGS. 1 and 2 to 8 onto a disc top stringer 31 as described with reference to FIGS. 9 to 11. The same reference numerals are used and the descriptions are referred to.

Figure 4:
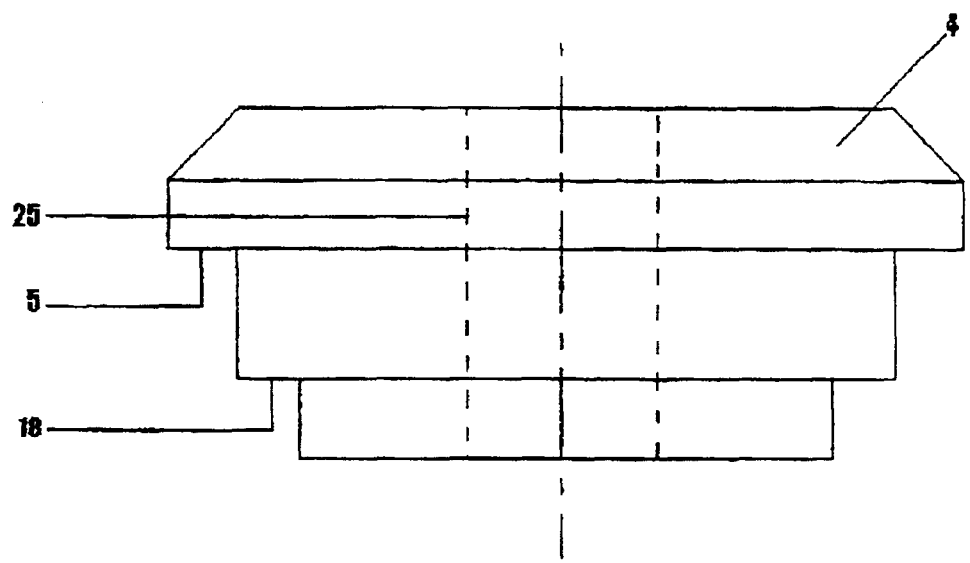
FIG. 4 is an elevation of the polymeric holding component of the fastener shown in FIGS. 1 and 3.

FIG. 4 shows the holding component 4, the description with reference to FIG. 1 is referred to and the same reference numerals ae used. The hole 25 for passage of the bolt in use is shown in broken lines.

Figure 5:
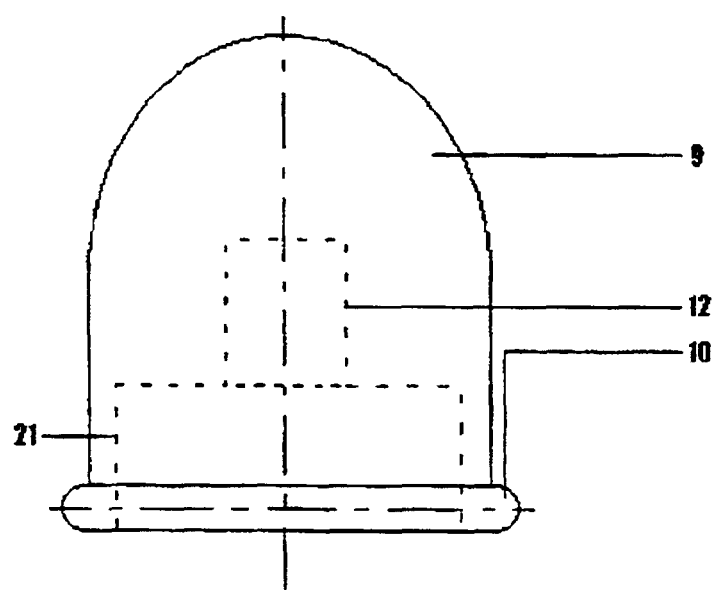
FIG. 5 is an elevation of the cover of the fastener shown in FIGS. 1 and 3.

FIG. 5 shows the cover 9, the same reference numerals are used as in FIG. 1 and the description is referred to.

Figure 6:
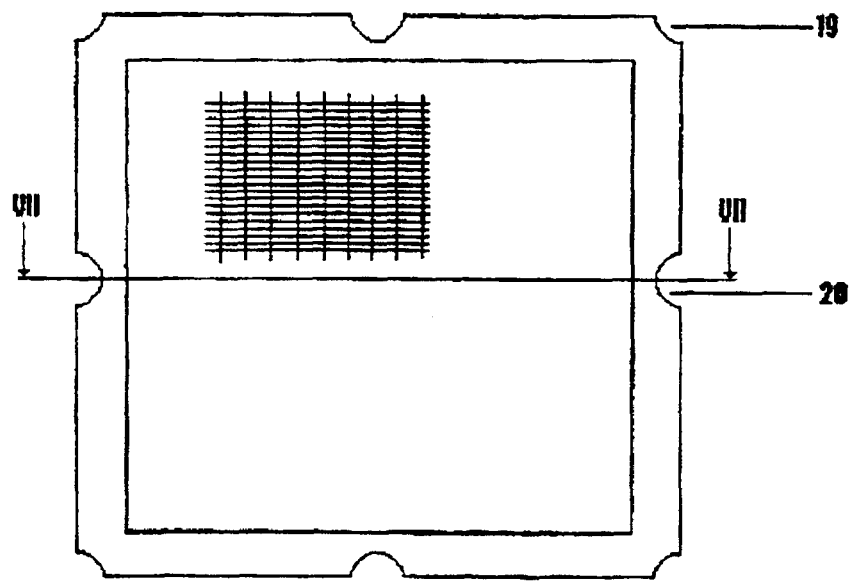
FIG. 6 is a plan view on a panel having co-acting formations for the fastener shown in FIGS. 1 and 3.
Figure 7:
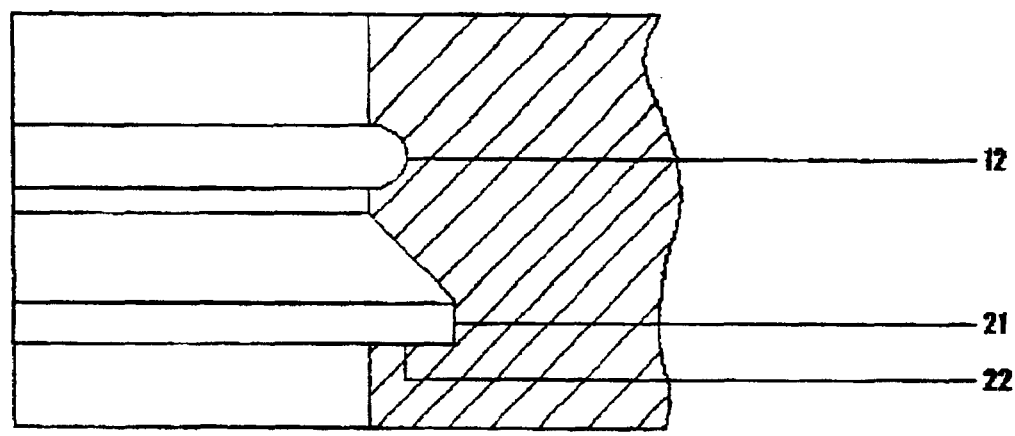
FIG. 7 is a cross sectional elevation, on section VII-VII shown in FIG. 7, of the co-acting formations.

FIGS. 6 and 7 are exemplary of a simple panel having formations for the fastener shown in FIGS. 1 to 5. The panel can have quarter circle formations at its corners and half circle formations 20 at its edges. Each formation includes the indentation 12 for the cover skirt and indentation 21 for the ledge of the holding component. The area of the surface 22, corresponding to the area of the ledge 5 formed by the step of the holding component is important. It must be sufficient to take the forces generated by high accelerations of the screen frame without generating too high stresses in the material of the panel and the holding component.

Figure 8:
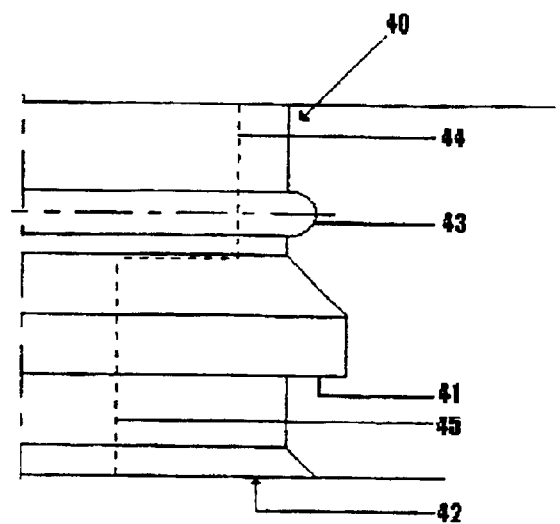
FIG. 8 is an elevation of an alternative polymeric holding component to that shown in FIGS. 1 and 3.

FIG. 8 shows an alternative holding component. It has a ledge 41 for holding down a panel, a surface 42 to rest on the frame or stringer disc, a formation 43 to engage with a co-acting formation of the panel, a bore 44 for th enut and a bore 45 for the bolt shaft.

Figure 9:
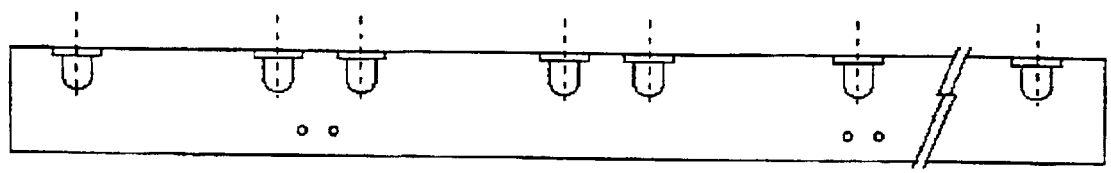
FIG. 9 is a side elevation of a disc top stringer in accordance with a preferred embodiment of the invention.
Figure 10:
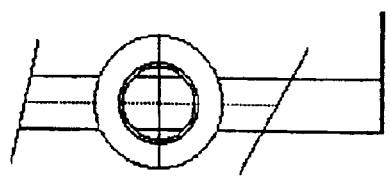
FIG. 10 is an enlarged plan view of a portion of the stringer.
Figure 10:
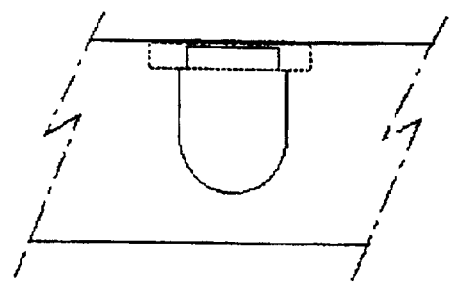
Figure 11:
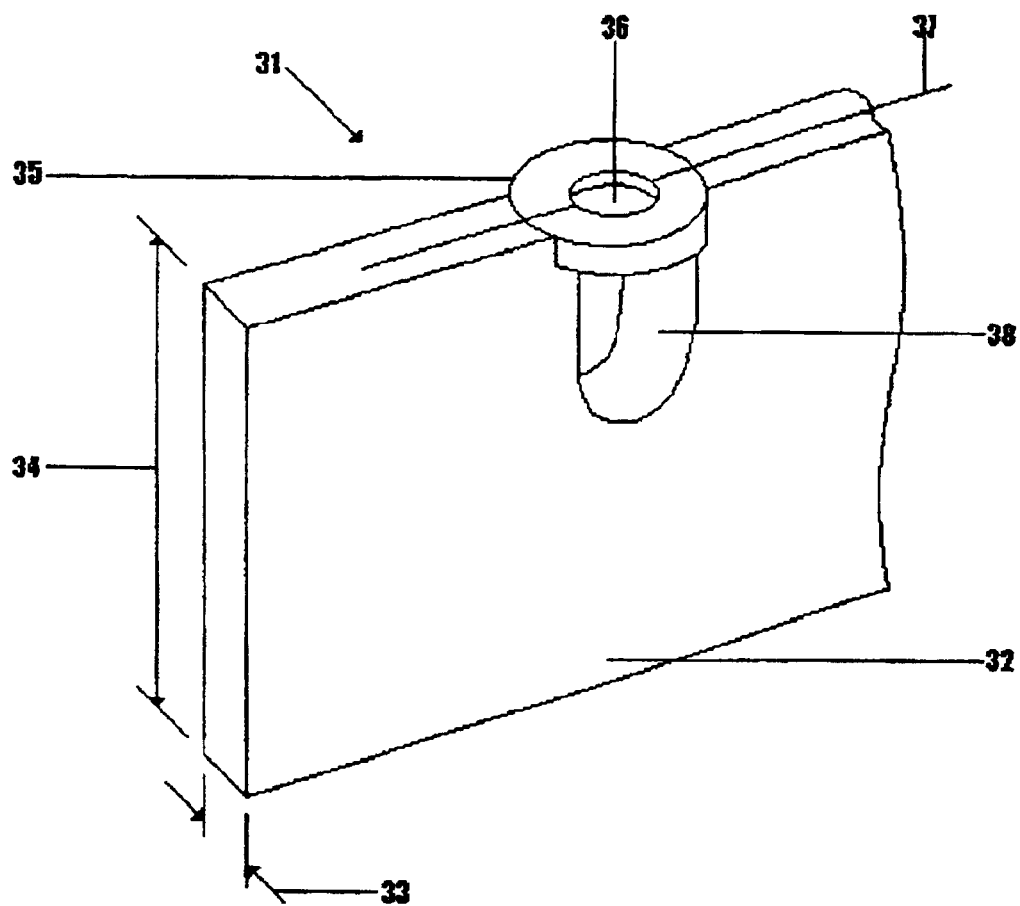
FIG. 11 is an enlarged elevation of the portion of the stringer.

As shown in FIGS. 9 to 11 of the drawings, the stringer 31 comprises a flat strip 32 which has a narrow width 33 and a large depth 34. The strip is thus an inexpensive section.

The strip has a plurality of spaced apart platforms 35 along its length, in this example, of disc shape. Each disc has a hole 36 in it, for fastening a panel to the stringer by means of a bolt or other fastener (not shown). The centre of the hole is positioned coinciding with the centroid (indicated by broken line 37) of the stringer. This results in no eccentric loads being imposed on the stringer.

The upper surfaces of the platforms are flush with the upper surface of the stringer, this provides a continuous surface for support of panels.

To provide space for a bolt or other fastener to pass through the hole 36, a recess 38 is provided in the stringer.

The platform may be welded or otherwise fixed to the stringer in a suitable way.

The stringers may be provided as modules of a selected length, for example, as shown in FIG. 9, to suit conveniently screen frames in which they will be used. The platforms can also be provided at standard spacings to suit the dimensions of panels which are to be mounted on and fixed to the stringers.

In principle the platforms can of course have other shapes than circular discs, and can be adapted to the panels to be supported and fixed.

What is claimed is:

1. A fastening means for screening panels, which fastening means includes:

fasteners, each fastener as a combination structure having a metal bolt as a tensile component and a polymeric holding component which has a ledge for holding down a panel;

and a stringer for use as a joist in a screen frame, the stringer comprising a strip of cross section having a narrow width and depth sufficient to carry vertical reciprocating loads, presenting neither a top nor a bottom web, but a plurality of spaced apart platforms;

each platform presenting a fastening formation which receives the tensile component, for securing a panel and a support area around or adjacent the fastening formation for supporting the panel; and characterized in that there are a plurality of spaced apart separate fasteners and in that each platform is in the form of a disc having a hole in its centre and the hole is immediately above the centroid of the stringer, fixed directly to the stringer at the upper surface of the stringer with an opening in the stringer immediately below the platform, and the bolt passes through the polymeric holding component and projects above the top of it.

2. The fastening means as claimed in claim 1, which further includes a separate cover for an exposed portion of the metal tensile component.

3. The fastening means as claimed in claim 2, in which the cover has a skirt providing an improved barrier to ingress of material.

4. The fastening means as claimed in claim 1, in which each fastener is provided in combination with a toggle or butterfly near an end of the metal tensile component, for engaging the hole in the disc hold on the stringer.

5. The fastening means as claimed in claim 4, in which the toggle comprises a strip or plate with the tensile member passing through an offset hole, the plate narrow enough to be passed through the hole in the screening frame member when misaligned, but long enough to be held when aligned.

6. The fastening means as claimed in claim 4, in which the polymeric holding component is provided with a further step which fits into an enlarged hole provided in the screen frame.

7. The fastening means as claimed in claim 1, wherein said screening panel is provided with co-acting formations for co-acting with the fastener, in which that part of the formation of the panel for co-acting with the ledge of the fastener is located at an intermediate position in the depth of the panel, in which the co-acting formations in the panel are provided at the edges of the panel and in which the co-acting formations include also a portion for co-acting with the skirt, which formations allow the skirt to enter partially into the depth of the panel.

8. The fastening means as claimed in claim 1, further including a separate cover for an exposed portion of the metal tensile component, the bolt passing through the polymeric holding component and projecting from the top of it.

9. The fastening means as claimed in claim 8, in which the cover has a skirt which fits into a co-acting recess in the edges of the panel providing an improved barrier to ingress of material.

10. The fastening means as claimed in claim 8, further comprising a toggle near an end of the metal tensile component, for engaging a blind hole in said screen frame wherein the toggle comprises a strip of plate with the tensile member passing through a offset hold, the plate narrow enough to be passed through a hole in the screening frame member when misaligned, but enough to be held when aligned.

11. The fastening means as claimed in claim 7, wherein said hole provides a fastening formation and the portion of the disc surrounding the hole of the disc provides a support area for the panel around the hole.

* * * * *